J. J. KNECHT.
JACQUARD PATTERN GEAR FOR EMBROIDERING MACHINES.
APPLICATION FILED APR. 16, 1910.
1,005,436.
Patented Oct. 10, 1911.
8 SHEETS—SHEET 1.
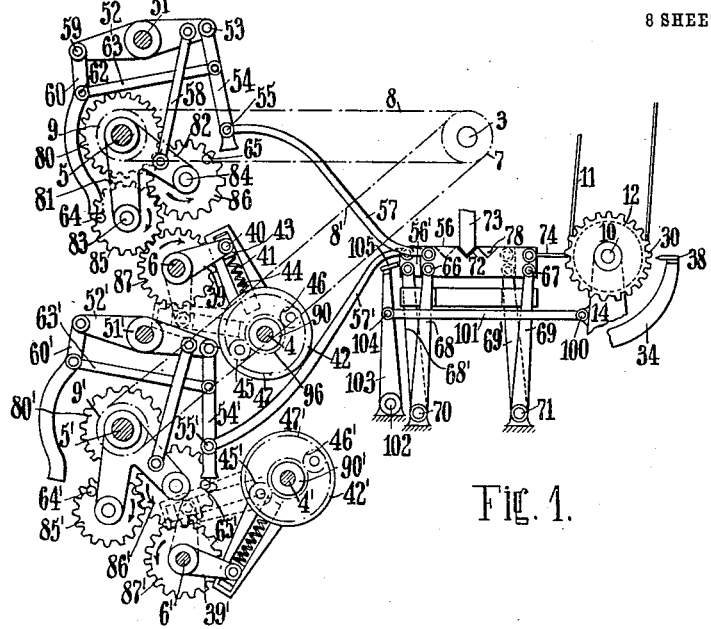

J. J. KNECHT.
JACQUARD PATTERN GEAR FOR EMBROIDERING MACHINES.
APPLICATION FILED APR. 16, 1910.
1,005,436. Patented Oct. 10, 1911.
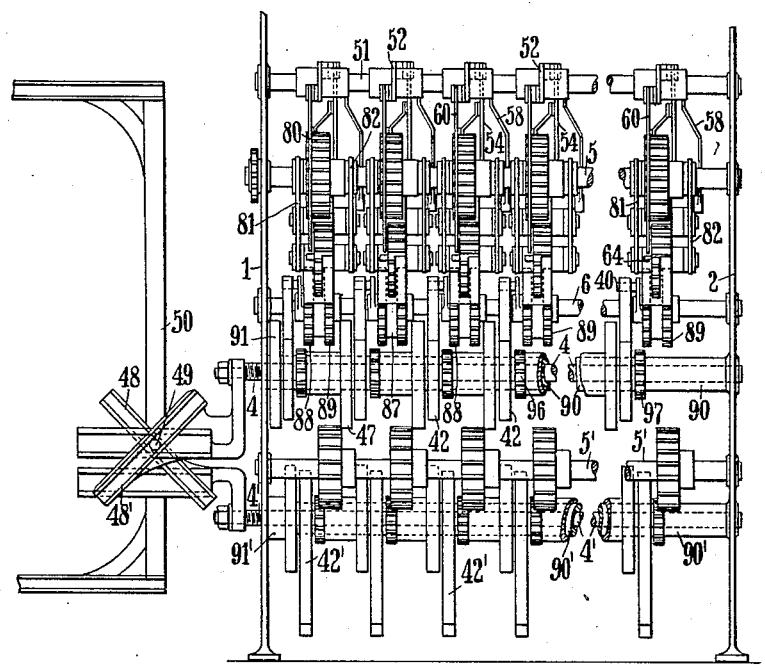
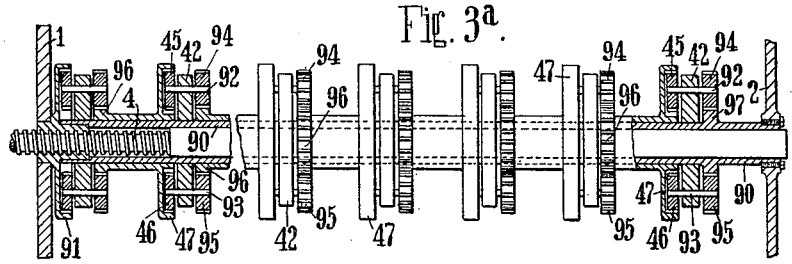

J. J. KNECHT.
JACQUARD PATTERN GEAR FOR EMBROIDERING MACHINES.
APPLICATION FILED APR. 16, 1910.
1,005,436.
Patented Oct. 10, 1911.
8 SHEETS—SHEET 3.
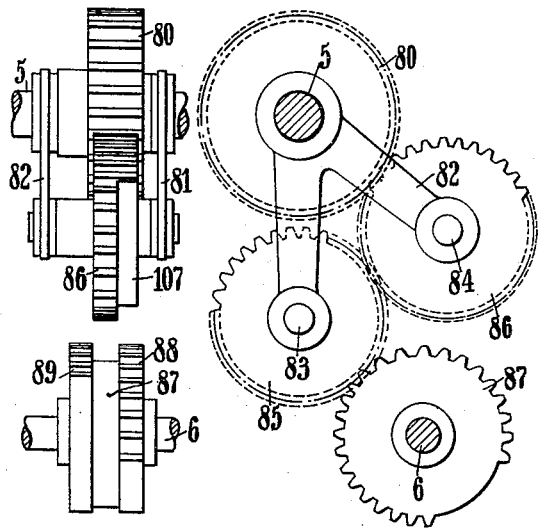
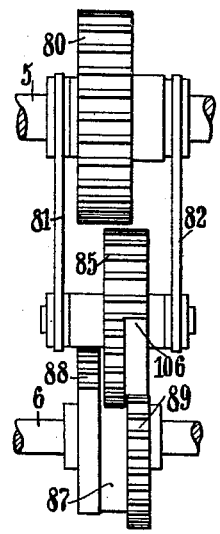
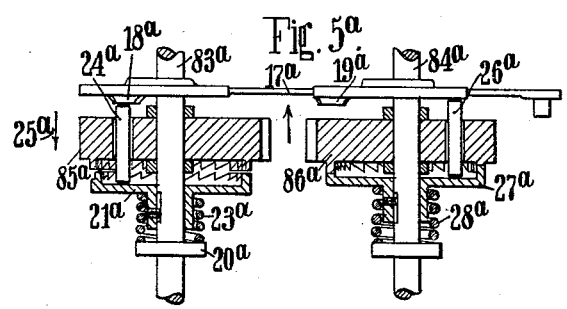
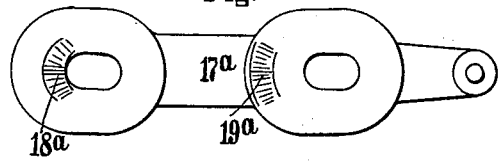
Inventor
Johann Jacob Knecht
by B. Singer
Atty
Witnesses
E. Schallinger

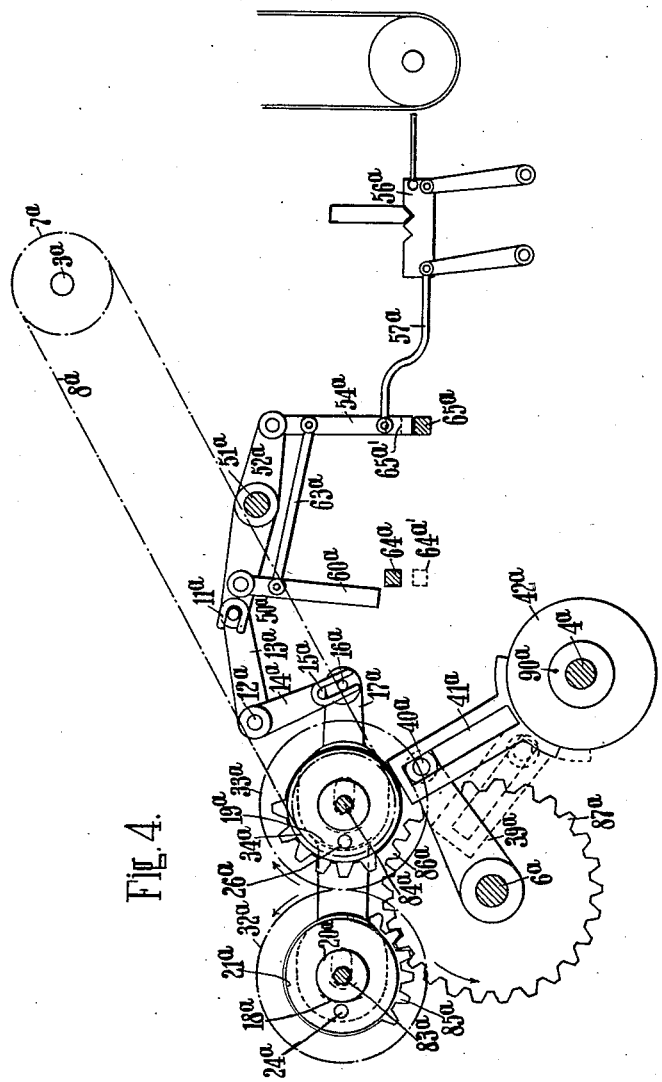

J. J. KNECHT.
JACQUARD PATTERN GEAR FOR EMBROIDERING MACHINES.
APPLICATION FILED APR. 16, 1910.
1,005,436.
Patented Oct. 10, 1911.
8 SHEETS—SHEET 5.
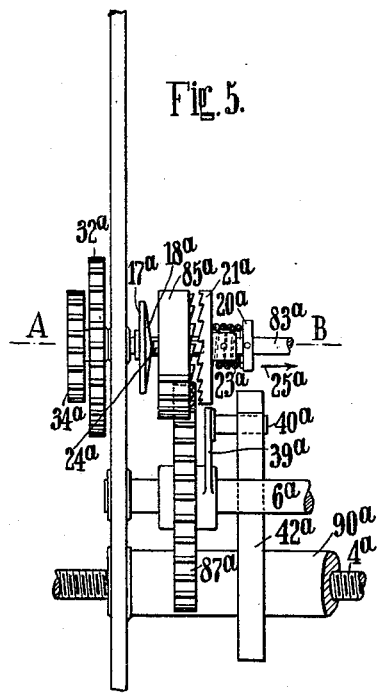
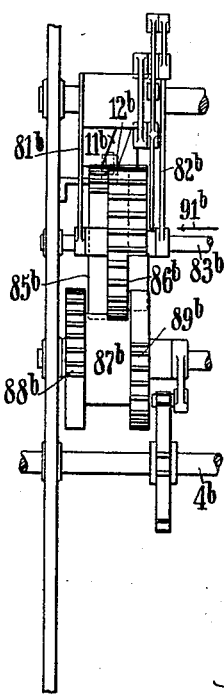
Witnesses
E. Schallinger
R. Goodstein
Inventor
Johann Jacob Knecht
By B. Singer
Att'y J. J. KNECHT.
JACQUARD PATTERN GEAR FOR EMBROIDERING MACHINES.
APPLICATION FILED APR. 16, 1910.
1,005,436.
Patented Oct. 10, 1911.
8 SHEETS—SHEET 6.
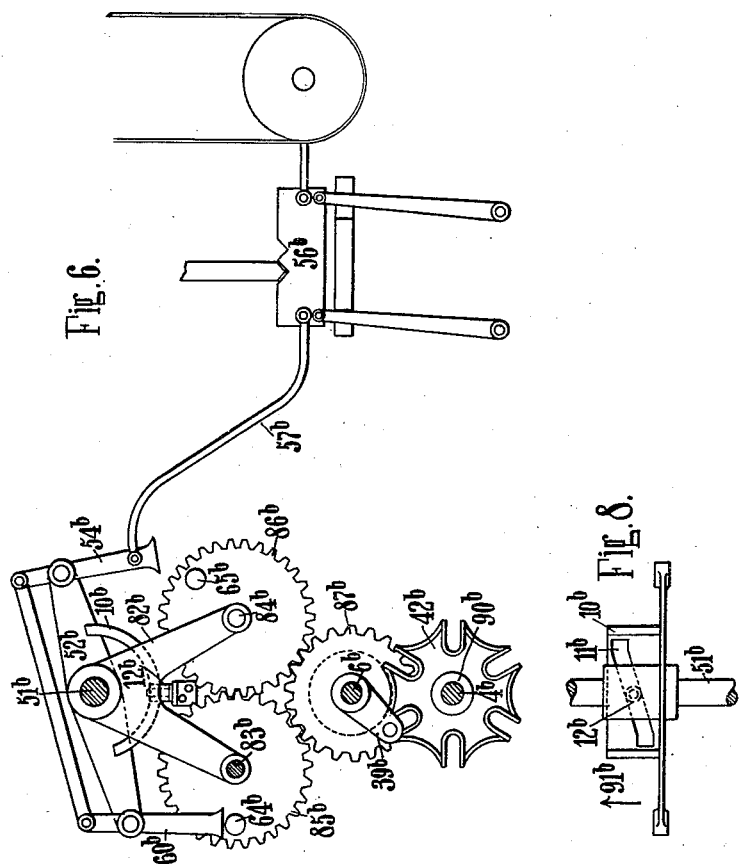

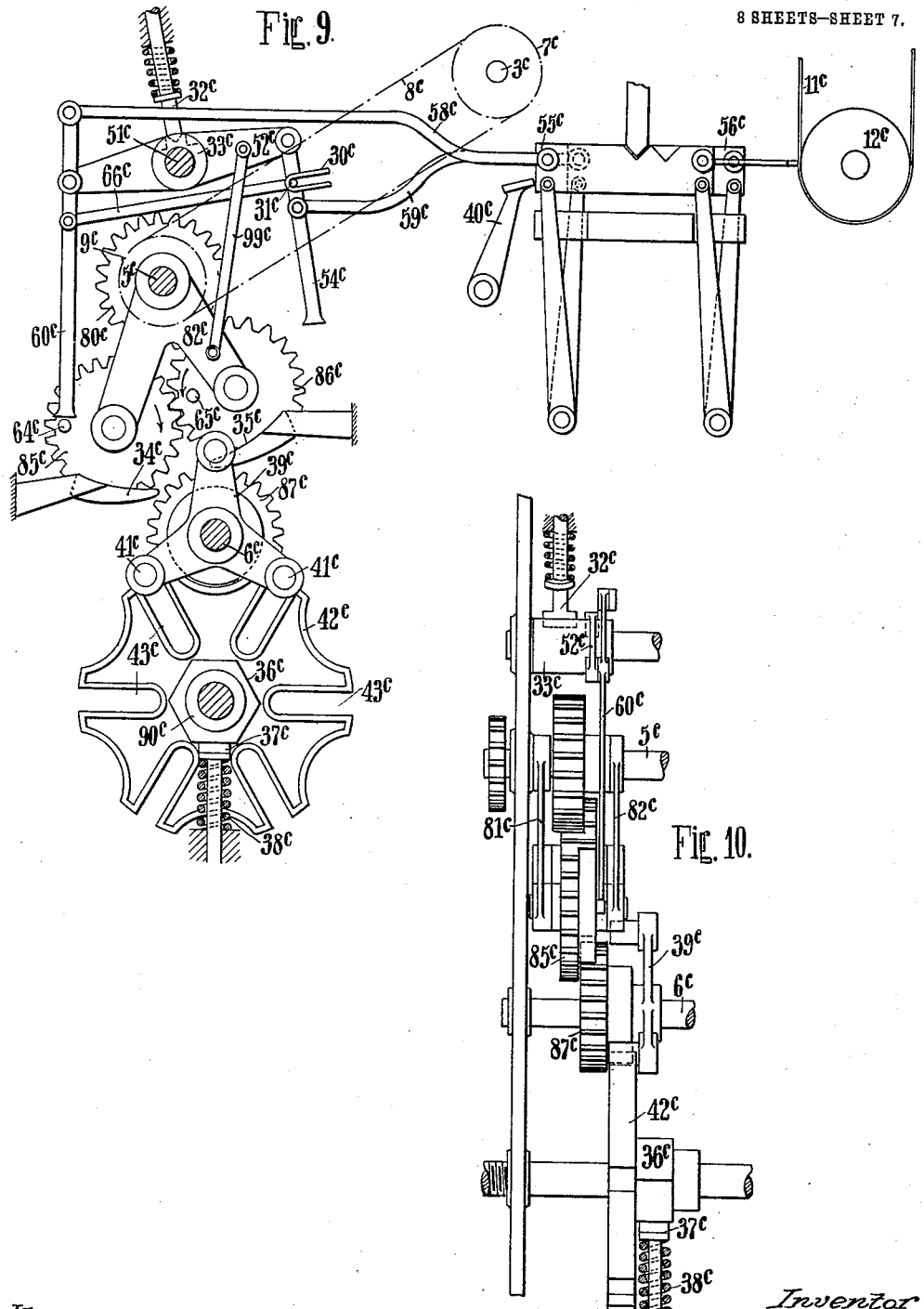

J. J. KNECHT.
JACQUARD PATTERN GEAR FOR EMBROIDERING MACHINES.
APPLICATION FILED APR. 16, 1910.
1,005,436.
Patented Oct. 10, 1911.
8 SHEETS—SHEET 8.
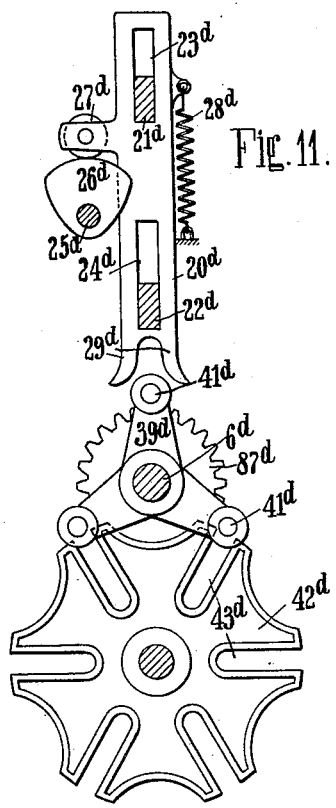
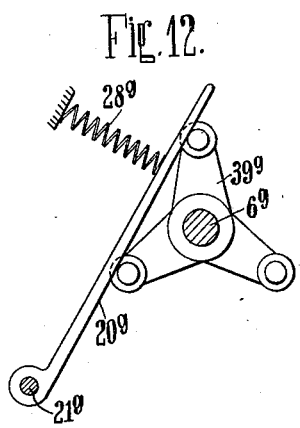
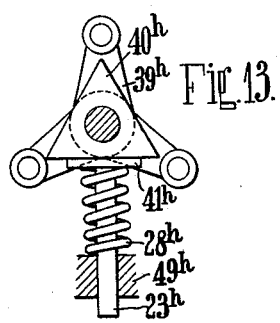
Witnesses
E. Schallinger
R. Roodstein
Inventor
Johann Jacob Knecht
by B. Singer
Att'y

UNITED STATES PATENT OFFICE.

JOHANN JACOB KNECHT, OF CHEMNITZ, GERMANY.

JACQUARD PATTERN-GEAR FOR EMBROIDERING-MACHINES.

1,005,436. Specification of Letters Patent. Patented Oct. 10, 1911.

Application filed April 16, 1910. Serial No. 555,829.

*To all whom it may concern:*

Be it known that I, JOHANN JACOB KNECHT, a citizen of Switzerland, and residing at Chemnitz, Germany, have invented certain new and useful Improvements in Jacquard Pattern-Gear for Embroidering-Machines, of which the following is a specification.

The subject-matter of my invention is improved jacquard pattern-gear for embroidering-machines. The same differs from pattern-gear of this kind known heretofore in that the motion of a main shaft is imparted by pinions arranged in pairs to the planet-wheel gear which moves the embroidery frame, the pinions of each pair being rotated in opposite directions and, when the jacquard hooks are pushed backward and forward, caused to engage alternately with a gear wheel operatively connected with the planet-wheel gear.

Some illustrative embodiments of my invention are represented by way of example in the accompanying drawings, wherein:—

Figures 1 to $3^d$ show the first illustrative embodiment, Fig. 1 being a front elevation, Fig. 2 a top plan view, parts having been removed, and Fig. 3 a side elevation, while Fig. $3^a$ shows a shaft and planet-wheel gearing on a larger scale partly in elevation and partly in section, Fig. $3^b$ shows an angle lever carrying a pair of pinions in side elevation on an enlarged scale, and Figs. $3^c$ and $3^d$ show end elevations of the latter; Figs. 4 to $5^b$ show the second illustrative embodiment, Fig. 4 being a front elevation, Fig. 5 a side elevation, while Fig. $5^a$ is a horizontal section on an enlarged scale in the plane A—B in Fig. 5, and Fig. $5^b$ is an elevation of a slide on an enlarged scale as seen in the direction of the arrow in Fig. $5^a$; Figs. 6, 7, and 8 show the third illustrative embodiment. Fig. 6 is a front elevation. Fig. 7 is a side elevation. Fig. 8 shows details and Figs. 9 and 10 show the fourth illustrative embodiment in front and side elevation, respectively, whereas Figs. 11 to 13 each shows a form of stop mechanism in elevation.

Referring to the drawings, the first illustrative embodiment shown in Figs. 1 to $3^d$ will first be described.

1, 2 designate the two side walls of the machines, in which are journaled the main driving shaft 3 and the shafts 5, 5' driven thereby. On the wall 2 are rigidly secured the two bushings or hollow shafts 90, 90' in which the endless screws 4 and 4', respectively, are axially displaceable, but not revoluble. The threads of the screws 4, 4' engage in the threads of the nuts 91, 91' respectively which are revoluble but not axially displaceable. On the walls 1, 2 are also secured the axles 6, 6'. On the shaft 3 are secured two sprocket wheels 7 and 7', of which wheel 7 imparts the rotatory motion of shaft 3 to shaft 5 by means of chain 8 and sprocket wheel 9, while the sprocket wheel 7' imparts the rotatory motion of the shaft 3 by means of chain 8' and sprocket wheel 9' to the shaft 5'. The shaft 10 of the cylinder 12 carrying the jacquard cards 11 is journaled in standards 13, 14, which are each provided with two guide rods 15, 16 and 17, 18, respectively, which are guided in guides 19, 20 and 21, 22, respectively.

As Fig. 2 shows, the guides 19, 21 are secured to the side walls 1 and 2, respectively, and the guides 20, 22 are respectively rigidly connected with the same walls. To the guide rod 17 is pivoted at 23 the rod 24 which carries at its end the roller 25. On the shaft 5 is secured the cam disk 26 which coacts with the roller 25 and moves the rod 24 in the direction of arrow 27. A spring 29 is secured by one end at 28 to the rod 24 and by its other end to the wall 2. This spring tends to move the rod 24 with the shaft 10 and cylinder 12 in a direction opposite to the arrow 27 (Fig. 2). On shaft 10 is secured the ratchet wheel 30 which participates in the reciprocating motion of shaft 10 and cylinder 12. On wall 2 is mounted the pawl 31 which holds the ratchet wheel 30 as soon as shaft 10 and cylinder 12 occupy the position in which they are shown in Fig. 2. On wall 2 is also secured a pivot 32, on which is fulcrumed the two-armed lever 33, 34. Arm 33 carries a roller 35, with which a cam 36 secured on shaft 5 coacts. When the arm 33 rocks upward, the tension of the spring 37, which is attached at one end to the arm 33 and at the other end to the wall 2, must be overcome. The arm 34 carries at one end the pawl 38 which, when the lever rocks, rotates the ratchet wheel 30 one tooth together with shaft 10 and cylinder 12 at the moment when the cylinder has been removed from the hooks.

Gear wheels 80 are secured on the shaft 5. At each side of these wheels are journaled two angle levers 81, 82 (Figs. 3<sup>b</sup> and 3<sup>c</sup>), which carry on their pivots 83, 84 the above mentioned pinions or spur wheels 85, 86 arranged in pairs. On the axle 6 are journaled gear wheels 87 (Figs. 1 and 2). When the angle-levers 81, 82 (Fig. 3<sup>b</sup>) are rotated clockwise, wheel 85 is removed from wheel 87 and wheel 86 approaches the same. This wheel 87 comprises two parallel sets of teeth, 88, 89 (Fig. 3<sup>d</sup>) which however do not extend over the entire periphery, but only over approximately one third thereof, and are separated from one another by a non-serrated part. The wheel 85 (Fig. 3<sup>c</sup>) is provided with a complete circle of teeth on only half the breadth of its periphery, namely where it engages with the wheel 86. On the other half of its periphery the toothed rim extends at 106 over only approximately one third of the periphery. The consequence is that when the wheel 85 meshes with the teeth 89 of wheel 87, which is the case, for example, in the position according to Fig. 3<sup>b</sup>, the wheel 85 can transmit motion to the wheel 87 only when the rim of teeth of wheel 85 extending over the entire breadth thereof admits of this. In like manner, the wheel 86 has a complete rim of teeth on the one half of its breadth which guarantees continuous engagement with the wheels 80 and 85, but on the other half of its breadth, at 107, it has a rim of teeth extending only approximately over one third the periphery. Consequently, when the angle levers 81, 82 rotate clockwise and the wheel 86 meshes with the rim of teeth 88 of the wheel 87, the motion of the wheel 86 is imparted to the wheel 87 only to such an extent as is admitted by the rim of teeth of the wheel 86 extending over its entire breadth and meshing with the rim of teeth 88 of the wheel 87. Consequently, owing to the angle levers 81, 82 arriving either into the position according to Fig. 3<sup>b</sup> or into that position, in which not the wheel 85, but the wheel 86 is in mesh with the corresponding rim of teeth of the wheel 87, rotatory motion is imparted sometimes in one direction and sometimes in the opposite direction to the wheel 87 on the shaft 6. Each wheel 87 is rigidly connected with a crank 39 whose pin 40 moves in a slotted extension 41 of a planet-wheel carrier 42 journaled free to rotate on the hollow shaft 90. The pin 40 slides in the slot 41 by means of a block 43 which is under the action of the spring 44.

In the two walls of the machine is secured, in addition, an axle 51, on which the riders 52 are mounted to rock. Each rider is pivotally connected at its one end 53 with a limb or link 54. Each link is pivotally connected at 55 with the rod 57 pivoted to the appertaining hook 56. The one arm of the lever 82 is pivotally connected by the rod 58 with the one arm of the rider 52. The other end of each rider is pivotally connected at 59 with a limb or link 60. Each link 60 is pivotally connected at 62 with a rod 63 which is pivoted to a link 54. The wheel 85 carries a pin 64 which can hit against the link 60, and the wheel 86 carries a pin 65 for coacting with a link 54. Each hook 56 is pivotally connected at 66 and 67 with two arms 68, 69 which are fulcrumed at 70 and 71, respectively, on the frame of the machine. When the hooks are moved horizontally by the jacquard card into the forward position occupied by hook 56' shown in Fig. 2, the arm 69 is rocked into the position occupied by arm 69' and the link 68 in the position occupied by link 68'. In this manner the hooks are guided horizontally.

To each of the standards 13, 14 is pivoted at 100 a rod 101. The two rods 101 are each pivotally connected at 104 with a lever 103 fulcrumed at 102. The two levers 103 are connected by a straight edge or blade 105 with which they return the hooks moved by the jacquard card into their original position as soon as the cylinder 12 is removed from the hooks.

On the hollow shafts 90, 90' are journaled the planet-wheel carriers 42 and 42', respectively, formed as disks. They form parts of gearing for moving the embroidery frame. Such a gearing is represented in Fig. 3<sup>a</sup>. The bushing or hollow shaft 90 is integral with the rim of teeth 97 and carries wheels 47 which are revoluble but not axially displaceable thereon. These wheels 47 are shaped similarly to the wheel 91, but they have no screw thread in the hub. In each planet-wheel carrier 42 are journaled parallel to the worm 4 two short axles 92, 93 which each carries at one end a toothed planet-wheel 45 and 46, respectively, and at the other end a toothed planet-wheel 94 and 95, respectively. The wheels 94, 95 located to the extreme right-hand in Fig. 3<sup>a</sup> mesh with the fixed toothed rim 97. The wheels 45, 46 on the same shafts mesh with the inwardly-directed toothing of the adjacent wheel 47. Each of the wheels 47 is provided on its hub with a rim of teeth 96 like the rim 97 (see Fig. 3<sup>a</sup> left-hand) which meshes with the wheels 94, 95, of the left-hand adjacent planet-wheel carrier. The inwardly-directed toothing of each of these wheels 47, and also of wheel 91, has twice as many teeth as the rim of teeth 96 which has the same diameter and the same number of teeth as the stationary wheel 97. The parts of the gearing mounted around the hollow shaft 90' are arranged in an exactly similar manner as the parts of the gearing around the hollow shaft 90.

In consequence of their planet wheels 45, 46, the planet-wheel carriers 42 coact in such manner with the wheels 47 arranged beside them free to rotate around the shaft 90 that the endless screw 4 is axially displaced, when the planet-wheel carriers are each rotated the same angle in order commencing at the right in Fig. 3ᵃ, the amounts of such displacement being as the members of a geometrical series, *i. e.* as 1:2:4:8:16:32:64: 128. For example, according as one or more of the wheels 87 are rotated, the individual amounts of displacement of the endless screw 4 caused by the rotation of the wheels 87 are added to or subtracted from one another. By rotating the wheels 87 in the one or other direction the endless screw 4 can consequently be moved axially optionally within definite limits. The same holds good for the endless screw 4′ which is driven in an exactly analogous manner as the endless screw 4. For this reason in Fig. 1 the corresponding reference characters are provided with the index ′. To the endless screws or worms 4 and 4′ are secured the two slides 48, 48′ which coact with the pivot of the embroidery frame 50, as shown in Fig. 3.

The above described form of my apparatus operates as follows:—As soon as the jacquard card strikes against the needles 74 of the hooks 56, some of the hooks enter with the needles into the holes in the jacquard card and consequently remain in their previous position. On the contrary, those hooks against whose needles a non-perforated part of the card strikes are displaced by the card into the position occupied by hook 56′ shown in Fig. 2. Those hooks which are pushed forward by the jacquard card place the limbs or links 54 over the pins 65 of the wheels 86 and the links 54′ over the pins 65′ of the wheel 86′. When these hooks are returned into their normal position by the blade 105 the limbs or links 60 arrive over the pins 64 of the wheels 85 and the links 60′ over the pins 64′ of the wheels 85′. This position of the links 54, 60 is shown at the top of Fig. 1, in which the pin 64 forces the link 60 upward during the rotation imparted to the wheel 85 by the main shaft 3 by means of the wheels 80 and 86. Consequently the wheel 85 becomes disengaged from the wheel 87, while the wheel 86 is caused to mesh with the wheel 87. At this moment the lifting cam 26 (Fig. 2) is in a position which corresponds to the greatest distance of the cylinder 12 from the hooks. The wheel 87 will now rotate in the direction of its arrow shown in Fig. 1, so that the planet-wheel carrier 42 is rotated into the position shown in dotted lines. The crank 39 and also the wheel 87 are held in this position by the coil spring 44 and prevented from being rotated unintentionally until the same hook is pushed forward by a non-perforated portion of the card. When the link 60 rises the link 54 falls, but its lower end does not arrive in the track of the pivot 65 because the hook 56 is in its extreme right-hand position. Now if a hook is pushed forward during the motion of the cylinder 12 to the left, the parts arrive into the position shown at the bottom of Fig. 1. The link 54′ has been brought by means of the rod 57′ over the pin 65′ which consequently forces the link 54′ upward, whereby the rider 52′ is rotated counter-clockwise. Consequently the wheel 86′ is disengaged from the wheel 87′, whereas the wheel 85′ is caused to mesh with the wheel 87′. At this moment the lifting cam 26 (Fig. 2) is in that position which corresponds to the least distance of the cylinder 12 from the hooks. As will readily be understood, the wheel 87′ rotates in the direction of its arrow, so that the planet-wheel carrier 42′ is rotated into the position shown in dotted lines. The crank 39′ remains in this position until the same hook has been pushed back by the straight edge 105 and the link 60′ is brought over the pin 64′. The hooks are held in their end positions by the stop pins 73. Each of the latter is raised and lowered by a lever 75, 76 fulcrumed at 79 and actuated by the cam 77, and then lies in one of the incisions 72 or 78 in the hooks.

In the second illustrative embodiment shown in Figs. 4 to 5ᵇ each of the hooks 56ᵃ is connected by a rod 57ᵃ with the one link or limb 54ᵃ of a rider 52ᵃ fulcrumed at 51ᵃ. The other link or limb 60ᵃ of this rider is connected by a guide rod 63ᵃ with the limb 54ᵃ. Below the limbs 54ᵃ and 60ᵃ are arranged two pins or stops 64ᵃ and 65ᵃ which are alternately raised and lowered by an eccentric not shown. The one stop 64ᵃ moves from its upper position into the position 64ᵃ′ shown in dotted lines, and the stop 65ᵃ from the bottom position into the upper position 65ᵃ′ shown in dotted lines. By means of its slot 11ᵃ the rider 52ᵃ clasps the pin 50ᵃ of the angle lever 13ᵃ, 14ᵃ fulcrumed at 12ᵃ. By means of its slot 15ᵃ the arm 14ᵃ clasps the pin 16ᵃ of the slide 17ᵃ which is mounted displaceable on the shafts 83ᵃ, 84ᵃ and is provided with two wedge-like blocks 18ᵃ, 19ᵃ. (Figs. 5, 5ᵃ and 5ᵇ.) The shafts 83ᵃ, 84ᵃ are journaled in the side walls of the machine. On shaft 83ᵃ is secured the gear wheel 32ᵃ and on shaft 84ᵃ the gear wheel 33ᵃ and the sprocket wheel 34ᵃ. This sprocket wheel is driven by means of the chain 8ᵃ by the sprocket wheel 7ᵃ secured on shaft 3ᵃ. The gear wheel 33ᵃ meshes with the gear wheel 32ᵃ. On the shaft 83ᵃ is also secured the collar 20ᵃ, and in front thereof the toothed clutch 21ᵃ which is axially displaceable but not rotatable on the shaft. On the shaft 83ᵃ is also journaled the gear wheel 85ᵃ which is not movable axially. A spring 23ᵃ tends to press the teeth of the clutch 21ᵃ against the face teeth of the gear wheel 85ᵃ, whereby the latter is coupled with the clutch 21ᵃ and then participates in the rotation of the shaft 83ᵃ. The wheel 85ᵃ is disconnected from the shaft 83ᵃ as soon as a pin 24ᵃ loose in the wheel 85ᵃ slides on the wedge-shaped block 18ᵃ of the slide 17ᵃ during the rotation of the wheel 85ᵃ, whereby the same is moved with the clutch 21ᵃ against the tension of the spring 23ᵃ, i. e. in the direction of the arrow 25ᵃ. The wheel 85ᵃ has teeth on only about one third of its periphery. The gear wheel 86ᵃ on the shaft 84ᵃ is connected with and disconnected from the same in a similar manner as the gear wheel 85ᵃ, for which purpose the slide is provided with the wedge-shaped block 19ᵃ and the pin 26ᵃ is loose in the wheel 86ᵃ. When the wedge-like block of the slide 17ᵃ is in the position shown in Fig. 5ᵃ, the wheel 86ᵃ is connected with the shaft 84ᵃ, whereas the wheel 85ᵃ is disconnected from its shaft. But as soon as the wheel 86ᵃ carrying the pin 26ᵃ passes the block 19ᵃ of the slide, the pin 26ᵃ is moved toward the clutch 27ᵃ, whereby this is disengaged from the wheel 86ᵃ against the action of the spring 28ᵃ. The wheel 86ᵃ likewise has teeth only over approximately one third of its periphery. The toothing of the wheels 85ᵃ and 86ᵃ are in such relative positions that both the wheels can mesh simultaneously with the gear wheel 87ᵃ. The axle 6ᵃ is also secured in the side walls of the machine. The gear wheels 87ᵃ are journaled on the same, as in the illustrative embodiment according to Figs. 1 to 3ᵇ. Each of the toothed rims of a pair of wheels 85ᵃ, 86ᵃ can engage with one of these gear wheels. Each of the wheels 87ᵃ is rigidly connected with a crank 39ᵃ. The pin 40ᵃ of the crank carries a block, which may be under the action of a spring, sliding in a slot of the crank 41ᵃ, as in the first illustrative embodiment. The crank 41ᵃ is connected with the planet-wheel carrier 42ᵃ. As in the first illustrative embodiment, here also the planet-wheel carriers are arranged on the bushing or hollow shaft 90ᵃ which is rigidly connected with the machine frame and in which the worm or endless screw 4ᵃ is axially movable but not rotatable. As in the first illustrative embodiment, the planet-wheel carriers 42ᵃ act by means of their planet wheels on the wheels beside them in such manner that the endless screw 4ᵃ is axially displaced; when each one of the planet-wheel carriers rotates and supposing this rotation takes place in order from one end of the worm to the other, the mounts of the displacement are as the members of a geometrical series. Now according as the hook is pushed forward by the non-perforated part of the jacquard card or remains in its normal position, the limb 54ᵃ or 60ᵃ is brought over the stop 65ᵃ or 64ᵃ, respectively. In the illustrative embodiment shown in Fig. 4 the advanced hook has moved the limb 54ᵃ over the stop 65ᵃ. Consequently, this limb is lifted by the upwardly moving stop and the rider 52ᵃ is rocked counter-clockwise. In this manner a clockwise oscillation is imparted to the lever 13ᵃ, 14ᵃ. Consequently, the slide 17ᵃ is moved to the left into the position shown in Fig. 5ᵃ. In this position of the slide the pin 24ᵃ loose in the wheel 85ᵃ slides against the wedge-shaped block 18ᵃ and is moved in the direction of the arrow 25ᵃ, whereby the wheel 85ᵃ is disconnected from the shaft 83ᵃ. The previously disconnected wheel 86ᵃ is coupled with the shaft 84ᵃ in consequence of the slide moving, so that the rotation of the shaft 3ᵃ and of the sprocket wheel 7ᵃ is transmitted by means of the gear wheel 34ᵃ, to the gear wheel 87ᵃ and to the planet-wheel carrier 42ᵃ, the crank 41ᵃ moving out of its position shown in dotted lines into that shown by full lines. The crank remains in this position until the advanced hook 56ᵃ has been pushed back by the straight edge not represented in Fig. 4, the limb 60ᵃ being placed over the stop 64ᵃ. As soon as this stop rises, the rider 52ᵃ together with the angle lever 13ᵃ, 14ᵃ is rocked back into the position shown in Fig. 4, so that the slide 17ᵃ likewise arrives into the right-hand position illustrated in Fig. 4, when the pin 26ᵃ runs onto the wedge-shaped block 19ᵃ and disconnects the wheel 86ᵃ from the shaft 84ᵃ. The pin 24ᵃ simultaneously slides off the wedge-shaped block 18ᵃ causing the wheel 85ᵃ to be coupled with the shaft 83ᵃ. The wheel 87ᵃ is then rotated in a direction opposite to its arrow, so that the crank 41ᵃ and the planet-wheel carrier 42ᵃ arrive into the position shown in dotted lines.

The illustrative embodiment according to Figs. 6 to 8 differs from that according to Figs. 1 to 3ᵇ principally in that the continuously-driven wheels 85ᵇ, 86ᵇ are not alternately connected with and disconnected from the wheel 87ᵇ by the oscillatory motion of the angle levers 81ᵇ, 82ᵇ, but by the axial movement of these angle levers. To this end, the angle levers 81ᵇ, 82ᵇ are not mounted to rock on the shaft 51ᵇ, but are axially movable thereon. The two shafts 83ᵇ, 84ᵇ, which are journaled in the side walls of the machine frame, extend through the limbs of the angle levers 81ᵇ, 82ᵇ, and when the angle levers are moved axially along the shaft 51ᵇ, the two limbs slide along the shafts 83ᵇ, 84ᵇ. The gear wheels 85ᵇ, 86ᵇ, which are also axially displaceable on the shafts 83ᵇ, 84ᵇ, respectively, are held by the limbs of the angle levers 81ᵇ, 82ᵇ (Fig. 7) so that they must participate in the axial displacement of the angle levers 81ᵇ, 82ᵇ. These levers are displaced axially in the one or other direction at the moment when the limb 60ᵇ or the limb 54ᵇ of the rider 52ᵇ is raised. For this purpose, the rider 52ᵇ which is mounted displaceable between the angle levers 81ᵇ, 82ᵇ is rigidly connected with a segment of a cylinder 10$^b$. The latter has a slanting slot 11$^b$ (Fig. 8) in which slides a roller 12$^b$. This roller is journaled on a pivot mounted vertically on the machine frame (Figs. 6 and 8). 83$^b$ designates the driving shaft, on which the wheel 85$^b$ is axially displaceable but driven by the shaft when it is rotated. The spring of the shaft 83$^b$ and the groove in the head of the shaft 85$^b$ are not to be found in the drawings. This wheel can be journaled in this manner by providing the shaft 83$^b$ with a spring which projects into a corresponding groove in the hub of the wheel 85$^b$. The shaft 6$^b$ is secured in the side walls of the machine. As in the first illustrative embodiment, the wheels 87$^b$ are journaled on this shaft and are formed similarly as in that embodiment, i. e. each possesses two parallel rims of teeth 88$^b$, 89$^b$, which, however, do not extend over the entire periphery, but only over about one third thereof. The wheel 85$^b$ has the same toothing as the wheel 85 and the wheel 86$^b$ the same toothing as the wheel 86 in the first illustrative embodiment according to Figs. 1 to 3$^b$.

The illustrative embodiment described with reference to Figs. 6 to 8 operates as follows:—Those hooks which, when the jacquard card hits against the needles of the hooks, are not advanced, but remain in the position into which they are pushed back by the straight edge, have placed a limb 60$^b$ of a rider 52$^b$ over a pin 64$^b$. Consequently, the pin 64$^b$ of the wheel 85$^b$, which is rotated by the main shaft 83$^b$ and constantly imparts its motion to the wheel 86$^b$, strikes against the limb 60$^b$, whereby a clockwise oscillatory motion is imparted to the rider 52$^b$. As the segment 10$^b$ rigidly connected with the rider 52$^b$ is displaced by means of the slot 11$^b$ and the roller 12$^b$, the rider 52$^b$ with the two angle levers 81$^b$, 82$^b$ and the wheels 85$^b$, 86$^b$ are displaced axially in the direction of the arrow 91$^b$. Therefore the wheel 85$^b$, which, as Fig. 7 shows, is disengaged from the rim of teeth 88$^b$, is caused to mesh with the same. Consequently, the motion of the driving shaft 83$^b$ is imparted, by means of the wheel 85$^b$, to the wheel 87$^b$ and by this by means of the crank 39$^b$ to the planet-wheel carrier 42$^b$ formed as a radially-slotted disk and to the hollow shaft 90$^b$ of the endless screw 4$^b$. When the hook 56$^b$ is advanced by the jacquard card, the limb 54$^b$ arrives over the pin 65$^b$. Consequently, the rider 52$^b$ is rotated counter-clockwise into the position shown in Fig. 6. In consequence of this motion the rider 52$^b$ with the two angle levers 81$^b$, 82$^b$ and the wheels 85$^b$, 86$^b$ are displaced axially in a direction opposite to the arrow 91$^b$. The wheel 85$^b$ is disengaged from the rim of teeth 88$^b$ and the wheel 86$^b$ is connected with the rim of teeth 89$^b$. Consequently, the rotation of shaft 83$^b$ and wheel 85$^b$ is imparted by means of the wheel 86$^b$ to the wheel 87$^b$, so that the wheel 87$^b$ now rotates in the opposite direction.

The fourth illustrative embodiment according to Figs. 9 and 10 differs from those already described, on the one hand, in that for each reciprocating displacement of the embroidery frame, not one, but always two hooks are employed, and, also, in that the two gear wheels of one pair of angle levers arrive after each rotation into a middle position, in which they are both disconnected from that gear wheel which imparts the motion to the planet-wheel carrier journaled free to rotate on the endless screw. In this illustrative embodiment, 3$^c$ designates the driving shaft carrying the sprocket wheel 7$^c$ which drives, by means of the chain 8$^c$, the sprocket wheel 9$^c$ on the shaft 5$^c$ which is journaled in the side walls of the machine. In the walls of the machine is also secured the axle 51$^c$, on which riders 52$^c$ are mounted to rock. Each rider is pivotally connected at its ends with the limbs 60$^c$, 54$^c$. To the limb 60$^c$ is pivoted the rod 66$^c$ which runs out at its other end into a fork 30$^c$, with which it clasps the pin 31$^c$ on the limb 54$^c$. For operating the gear wheels 85$^c$ and 86$^c$ hooks 55$^c$ and 56$^c$, respectively, are provided. The rod 58$^c$, which is pivotally connected with the extension of the limb 60$^c$ is pivoted to the hook 55$^c$. The hook 56$^c$ is pivotally connected with the rod 59$^c$ which is pivoted to the limb 54$^c$. On the shaft 5$^c$ is secured the wheel 80$^c$, on the two sides of which the angle levers 81$^c$, 82$^c$ are mounted free to rock on the shaft. The angle lever 82$^c$ is pivotally connected by a rod 99$^c$ with the rider 52$^c$. The gear wheels 85$^c$, 86$^c$ are journaled in the limbs of the angle levers 81$^c$, 82$^c$. The wheel 80$^c$ is constantly in engagement with the wheel 86$^c$ and this is constantly in engagement with the wheel 85$^c$. The wheels 85$^c$ and 86$^c$ are similar to the wheels 85 and 86 in the illustrative embodiment according to Figs. 1 to 3$^d$. In the walls of the machine frame is secured the shaft 6$^c$, on which the wheel 87$^c$ is journaled which is formed as an ordinary spur wheel and connected rigidly with the three-armed crank 39$^c$. On each arm of the crank is secured a pin 41$^c$. On the bushing or hollow shaft 90$^c$, which is secured in the machine frame and corresponds to the hollow shaft 90 in the illustrative embodiment according to Figs. 1 to 3$^d$, is journaled the planet-wheel carrier 42$^c$ formed as a radially-slotted disk. This planet-wheel carrier has six slots 43$^c$ arranged in such manner that when the wheel 87$^c$ rotates, or when the crank 39$^c$ is rotated 120° thereby, one of the crank-pins enters into one of the slots 43$^c$, reciprocates once in the same and finally leaves it, the planet-wheel carrier 42$^c$ being rotated one sixth of a revolution. The planet-wheel carrier is stopped by the three-armed crank; namely, when the shaft 6$^c$ rotates, the crank has one arm moving in a slot in the planet-wheel carrier 42$^c$ and feeds the latter, whereas at the end of the feeding motion two crank-pins hold the planet-wheel carrier. For stopping the planet-wheel carrier I provide, in addition, a hexagon 36$^c$, against one side of which a head 37$^c$ is pressed by means of a spring 38$^c$. The curved members 34$^c$, 35$^c$ are rigidly connected with the machine frame. The pins 64$^c$ and 65$^c$ are rigidly connected with the wheels 85$^c$ and 86$^c$, respectively, and are in such a position on their wheels that, when the wheels rotate in the direction of their arrows, the pins coact with the curved members and disconnect said wheels from the wheel 87$^c$.

This illustrative embodiment shown in Figs. 9 and 10 operates as follows:—When one of the two hooks, e. g. 55$^c$, is advanced by the jacquard card, as Fig. 9 clearly shows, the limb 60$^c$ is placed over the pin 64$^c$ of the wheel 85$^c$. Consequently, this limb is raised by the pin 64$^c$, whereby the rider 52$^c$ and the angle levers 81$^c$, 82$^c$ are rocked clockwise. This motion of the angle levers 81$^c$, 82$^c$ causes the wheel 86$^c$ to engage with the wheel 87$^c$, and consequently the rotary motion imparted by the main shaft 3$^c$ by means of the sprocket wheels 7$^c$, 9$^c$, shaft 5$^c$ and wheel 80$^c$ is transmitted to the wheel 87$^c$. The latter imparts the same to the planet-wheel carrier 42$^c$. As soon as the wheel 86$^c$ has rotated a definite distance, the pin 65$^c$ of the same coacts with the curved member 35$^c$ causing the wheel 86$^c$ to be disengaged from the wheel 87$^c$ and accordingly the wheels 85$^c$, 86$^c$ arrive into their previous middle position, in which they are disconnected from the wheel 87$^c$. When the wheel 87$^c$ and, accordingly, the planet-wheel carrier 42$^c$ are to be rotated back, the hook 56$^c$ must be advanced by the jacquard card. In this event, the limb 54$^c$ then arrives over the pin 65$^c$. When the wheel 86$^c$ rotates the pin 65$^c$ will lift the limb 54$^c$, so that the rider 52$^c$ and the angle levers 81$^c$, 82$^c$ are rotated counter-clockwise. The wheel 85$^c$ is hereby connected with the wheel 87$^c$. As soon as the wheel 85$^c$ has rotated a definite distance, the pin 64$^c$ hits against the curved member 34$^c$ whereby the wheel 85$^c$ is disconnected from the wheel 87$^c$ and arrives with the wheel 86$^c$ into the middle position. When both the hooks 55$^c$ and 56$^c$ remain in their normal position, which e. g. will be the case when holes are provided in the jacquard card for the two hooks of one element, the two hooks are not advanced but remain in their normal position into which they are returned by the straight edge 40$^c$, their needles entering into the perforations in the jacquard card. It is clear that the wheels 85$^c$, 86$^c$ then remain in the middle position, in which they are both out of engagement with the wheel 87$^c$. For the event of a hole of the jacquard card 11$^c$ not being located exactly in front of the appertaining needle, the two limbs are prevented from being operated simultaneously by the pin 31$^c$ on the limb 54$^c$ being clasped by the fork 30$^c$ of the rod 66$^c$. It is obvious that, when the limb 60$^c$ is placed by the hook 55$^c$ over the pin 64$^c$, the limb 54$^c$ is prevented from being placed over the pin 65$^c$ by the fork clasping the pin 31$^c$, and, reversely, when the limb 54$^c$ is placed over the pin 65$^c$, the limb 60$^c$ is likewise prevented from being placed over the pin 64$^c$ by the fork.

The stop mechanism illustrated in Fig. 11 comprises a slide 20$^d$ which is guided by the bars 21$^d$, 22$^d$ by means of the slots 23$^d$ and 24$^d$, respectively. In the machine frame is journaled the shaft 25$^d$ on which is secured the cam 26$^d$. The transmission of motion to the shaft 25$^d$ is such that this shaft rotates one complete revolution during each sixth of a revolution of the planet-wheel carrier 42$^d$. In one arm of the slide 20$^d$ is journaled the roller 27$^d$ with which the cam 26$^d$ coacts. To the machine frame is attached the one end of the spring 28$^d$ whose other end is attached to the slide 20$^d$ which runs out below into a fork 29$^d$. In the side walls of the machine frame is secured the shaft 6$^d$, on which the wheel 87$^d$ is mounted free to rotate. With the wheel 87$^d$ is rigidly connected the three-armed crank 39$^d$ carrying the pins 41$^d$ which, as in the illustrative embodiment last described, alternately enter into and leave the radial slots 43$^d$ of the disk 42$^d$. During each revolution of the shaft 25$^d$ the slide 20$^d$ is first raised by the cam 26$^d$ and then liberated by the same, whereupon it is moved downwardly under the action of the spring 28$^d$ and clasps with its forked end the pin 41$^d$ of the crank 39$^d$ thereby arresting the crank.

The stop mechanism according to Fig. 12 comprises an arm 20$^g$ fulcrumed at 21$^g$ and is pressed by spring 28$^g$ against the three-armed crank 39$^g$ journaled on the shaft 6$^g$.

In the stop mechanism of the crank according to Fig. 13 a triangle 40$^h$ is rigidly connected with the crank 39$^h$. In the machine frame is journaled axially displaceable in the abutment 49$^h$ a pin 23$^h$ which runs out above into a disk 41$^h$. Against this disk there acts the one end of the spring 28$^h$ which abuts with its other end against the abutment 49$^h$ and presses the disk 41$^h$ against one side of the triangle.

I claim:—

1. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a plurality of pairs of pinions, means driven by the main shaft for driving the pairs of pinions, the pinions of each pair being geared to rotate in opposite directions, a gear wheel arranged adjacent each pair of pinions and operatively connected with a planet-wheel carrier, and mechanism operatively connecting each pair of pinions with one of said hooks for bringing each pinion of a pair of pinions alternately into engagement with the gear wheel adjacent thereto when a hook is reciprocated.

2. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the latter shaft, a pair of pinions journaled in the limbs of each pair of angle levers and geared to rotate in opposite directions, each pinion having a portion of the periphery thereof free from teeth, means on the second shaft operatively connected with one of said pinions, a gear wheel arranged adjacent each pair of pinions and operatively connected with a planet-wheel carrier, and mechanism actuated by said hooks for bringing each pinion of a pair of pinions alternately into engagement with the gear wheel adjacent thereto.

3. In jacquard pattern-gear for embroidering-machines, the combination, with planet-wheel gearing, comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the latter shaft, a pair of pinions journaled in the limbs of each pair of angle levers and continuously in mesh one with the other, each pinion having a portion of the periphery thereof free from teeth, a wheel fixed on the second shaft between each pair of angle levers geard with one of said pinions, a gear wheel arranged adjacent each pair of pinions and operatively connected with a planet-wheel carrier, and mechanism actuated by said hooks for bringing each pinion of a pair of pinions alternately into engagement with the gear wheel adjacent thereto.

4. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a second shaft, driven by the main shaft, a plurality of pairs of angle levers free to rock on the second shaft, a pair of pinions journaled in the limbs of each pair of angle levers and geared to rotate in opposite directions, each pinion having a portion of the periphery thereof free from teeth, means on the second shaft operatively connected with one of said pinions, a gear wheel having a portion of the periphery thereof free from teeth, arranged adjacent each pair of pinions and operatively connected with a planet-wheel carrier, and mechanism actuated by said hooks for bringing each pinion of a pair of pinions alternately into engagement with the gear wheel adjacent thereto.

5. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the second shaft, a pair of pinions journaled in the limbs of each pair of angle levers and continuously in mesh one with the other, each pinion having a portion of the periphery thereof free from teeth, a wheel fixed on the second shaft between each pair of angle levers geared with one of said pinions, a gear wheel having a portion of the periphery thereof free from teeth, arranged adjacent each pair of pinions and operatively connected with a planet-wheel carrier, and mechanism actuated by said hooks for bringing each pinion of a pair of pinions alternately into engagement with the gear wheel adjacent thereto.

6. In jacquard pattern-gear for embroidering-machines the combination, with planet-wheel gearing comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the second shaft, a pair of pinions journaled in the limbs of each pair of angle levers and geared to rotate in opposite directions, each pinion having a portion of the periphery thereof free from teeth, means on the second shaft operatively connected with one of said pinions, a gear wheel having two sets of teeth each extending only over a portion of the periphery thereof, arranged adjacent each pair of pinions and operatively connected with a planet-wheel carrier, and mechanism actuated by said hooks for bringing each pinion of a pair of pinions alternately into engagement with the gear wheel adjacent thereto.

7. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the second shaft, a pair of pinions journaled in the limbs of each pair of angle levers and geared to rotate in opposite directions, each pinion having a portion of the periphery thereof free from teeth, means on the second shaft operatively connected with one of said pinions, a gear wheel having two separate parallel sets of teeth each extending only over a portion of the periphery thereof, arranged adjacent each pair of pinions and operatively connected with a planet-wheel carrier, and mechanism actuated by said hooks for bringing each pinion of a pair of pinions alternately into engagement with the gear wheel adjacent thereto.

8. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a plurality of pairs of pinions, means driven by the main shaft for driving the pairs of pinions, the pinions of each pair being geared to rotate in opposite directions, a gear wheel arranged adjacent each pair of pinions and operatively connected with a planet-wheel carrier, each pinion carrying a pin, and mechanism actuated by said hooks for coacting with the pins for bringing each pinion of a pair of pinions alternately into engagement with the gear wheel adjacent thereto.

9. In jacquard pattern-gear for embroidering-machines, the combination, with planet-wheel gearing comprising planet-wheel carriers for operating the embroidery frame, a main shaft, a plurality of hooks and jacquard mechanism driven by the main shaft for reciprocating the hooks, of a plurality of pairs of pinions, means driven by the main shaft for driving the pairs of pinions, the pinions of each pair being geared to rotate in opposite directions, a gear wheel arranged adjacent each pair of pinions and operatively connected with a planet-wheel carrier, each pinion carrying a pin, and mechanism actuated by said hooks for coacting with the pins for bringing each pinion of a pair of pinions alternately into engagement with the gear wheel adjacent thereto, and means for preventing the two pins of one pair of pinions coacting simultaneously with said mechanism.

10. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a plurality of pairs of pinions, means driven by the main shaft for driving the pairs of pinions, the pinions of each pair being geared to rotate in opposite directions, each planet-wheel carrier having a longitudinally slotted arm, a gear wheel arranged adjacent each pair of pinions, a crank, having a pin, attached to each gear wheel coacting with a slotted arm, and mechanism actuated by said hooks for bringing each pinion of a pair of pinions alternately into engagement with the gear wheel adjacent thereto.

11. In jacquard pattern-gear for embroidering-machines, the combination, with planet-wheel gearing comprising planet-wheel carriers for operating the embroidery frame, a main shaft, a plurality of hooks, and jacquard mechanism driven by the main shaft for reciprocating the hooks, of a second shaft driven by the main shaft, a plurality of pairs of angle levers free to rock on the second shaft, a pair of pinions journaled in the limbs of each pair of angle levers and geared to rotate in opposite directions, each pinion having a portion of the periphery thereof free from teeth, means on the second shaft operatively connected with one of said pinions, each planet-wheel carrier having a longitudinally slotted arm, a gear wheel arranged adjacent each pair of pinions, a crank, having a pin, attached to each gear wheel coacting with a slotted arm, and mechanism actuated by said hooks for bringing each pinion of a pair of pinions alternately into engagement with the gear wheel adjacent thereto.

In testimony whereof, I affix my signature in the presence of two witnesses.

JOHANN JACOB KNECHT.

Witnesses:
WILLIAM J. KONJETSING,
MAX J. BENNDORF.

---

Copies of this patent may be obtained for five cents each, by addressing the "Commissioner of Patents, Washington, D. C."